United States Patent Office.

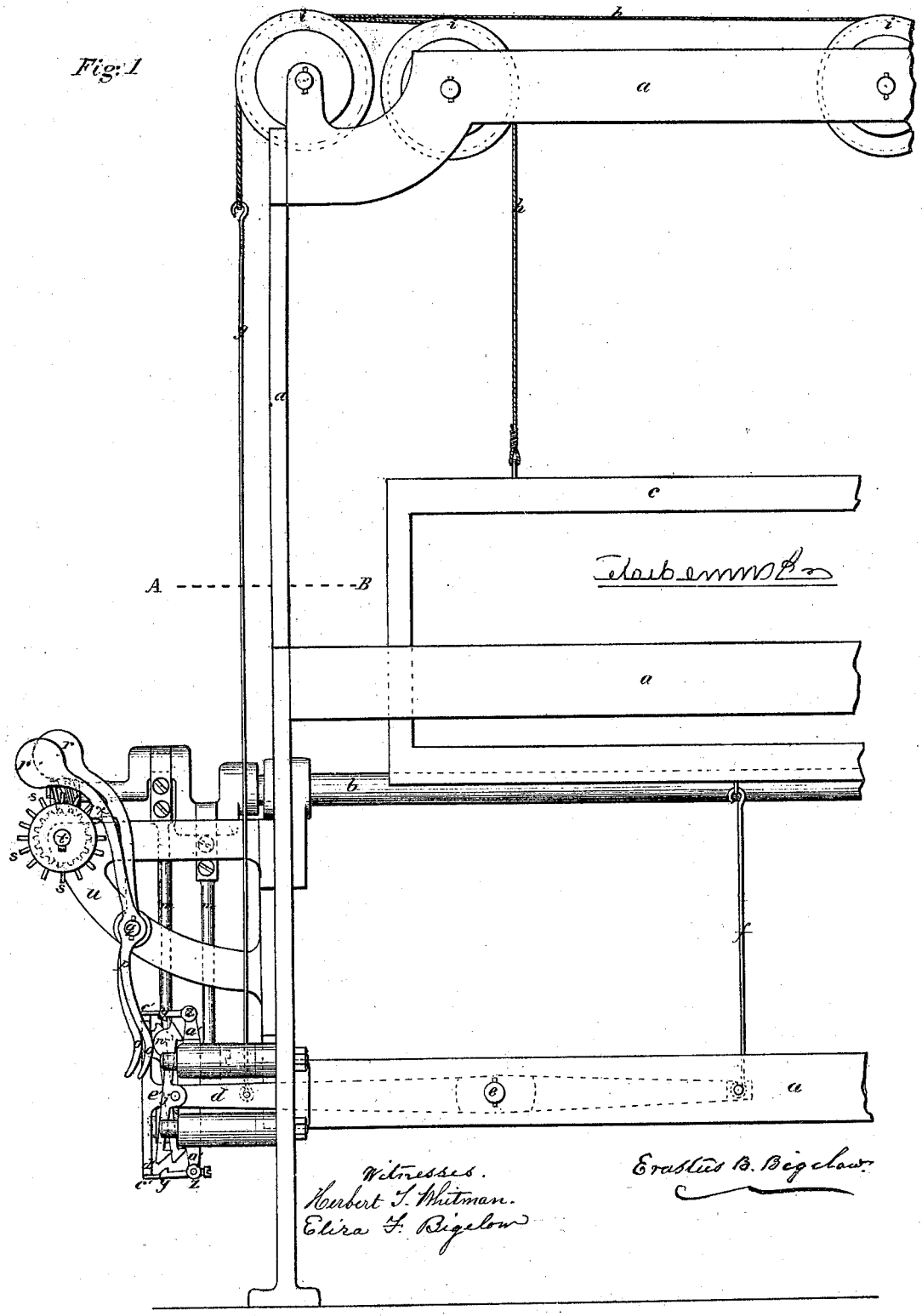

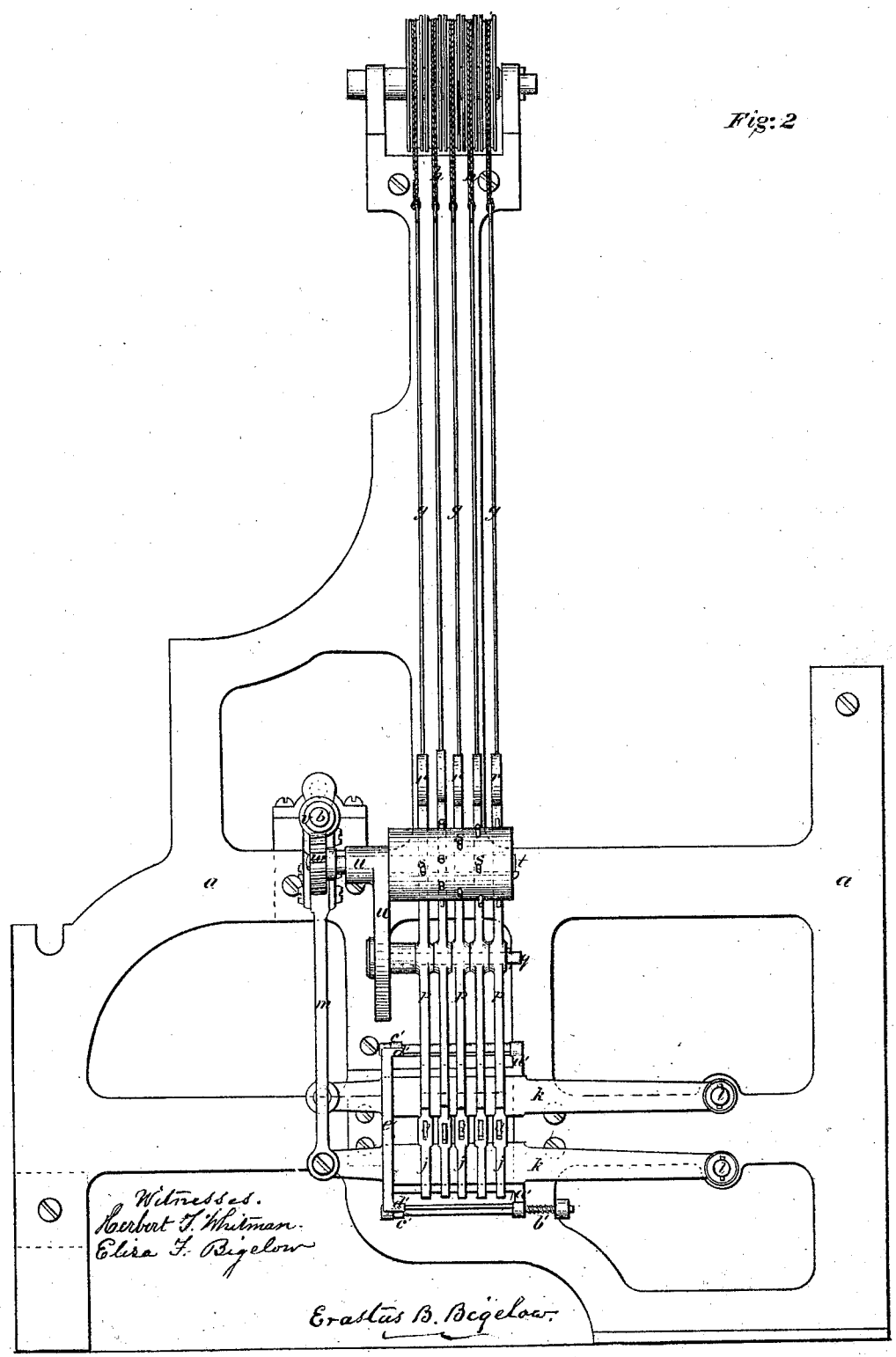

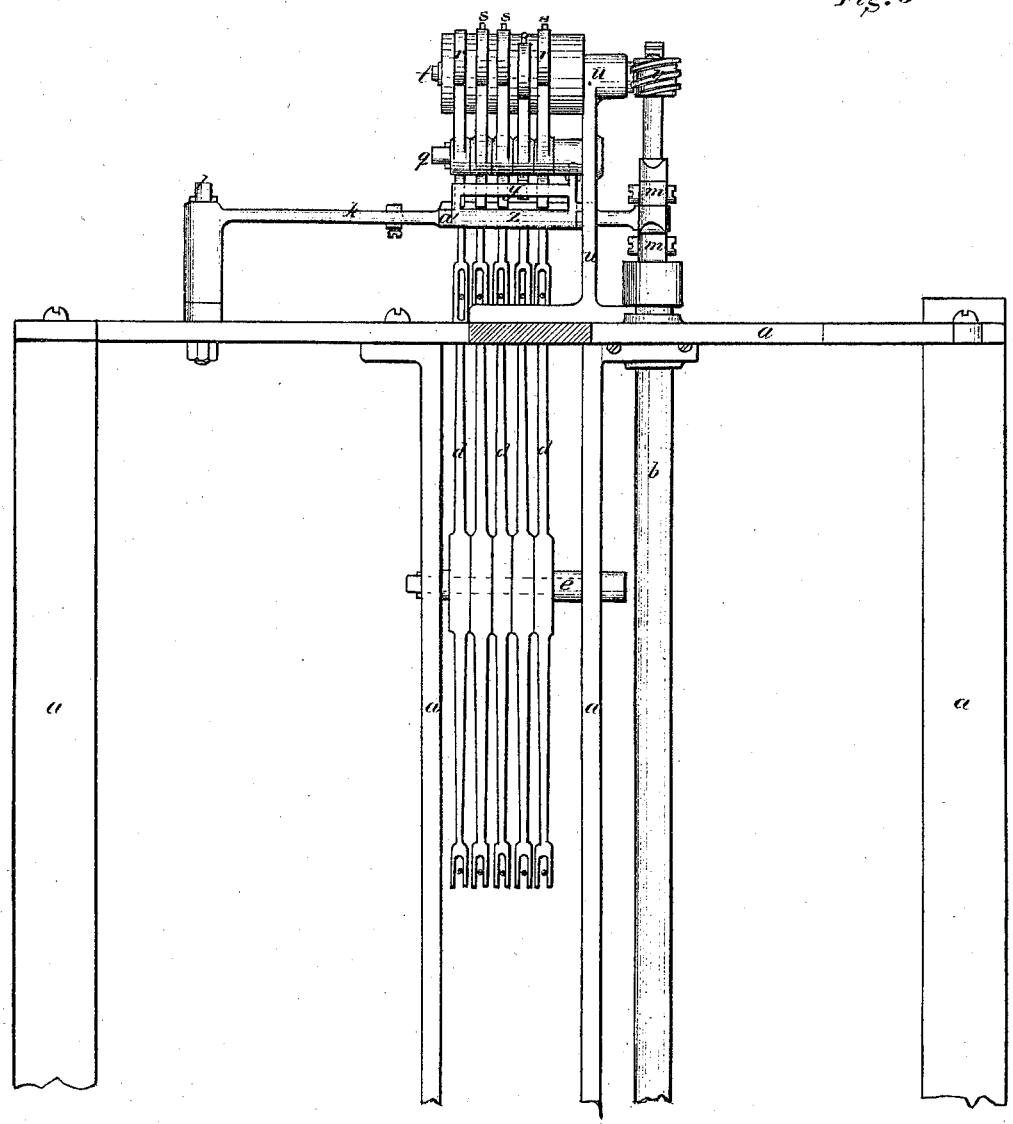

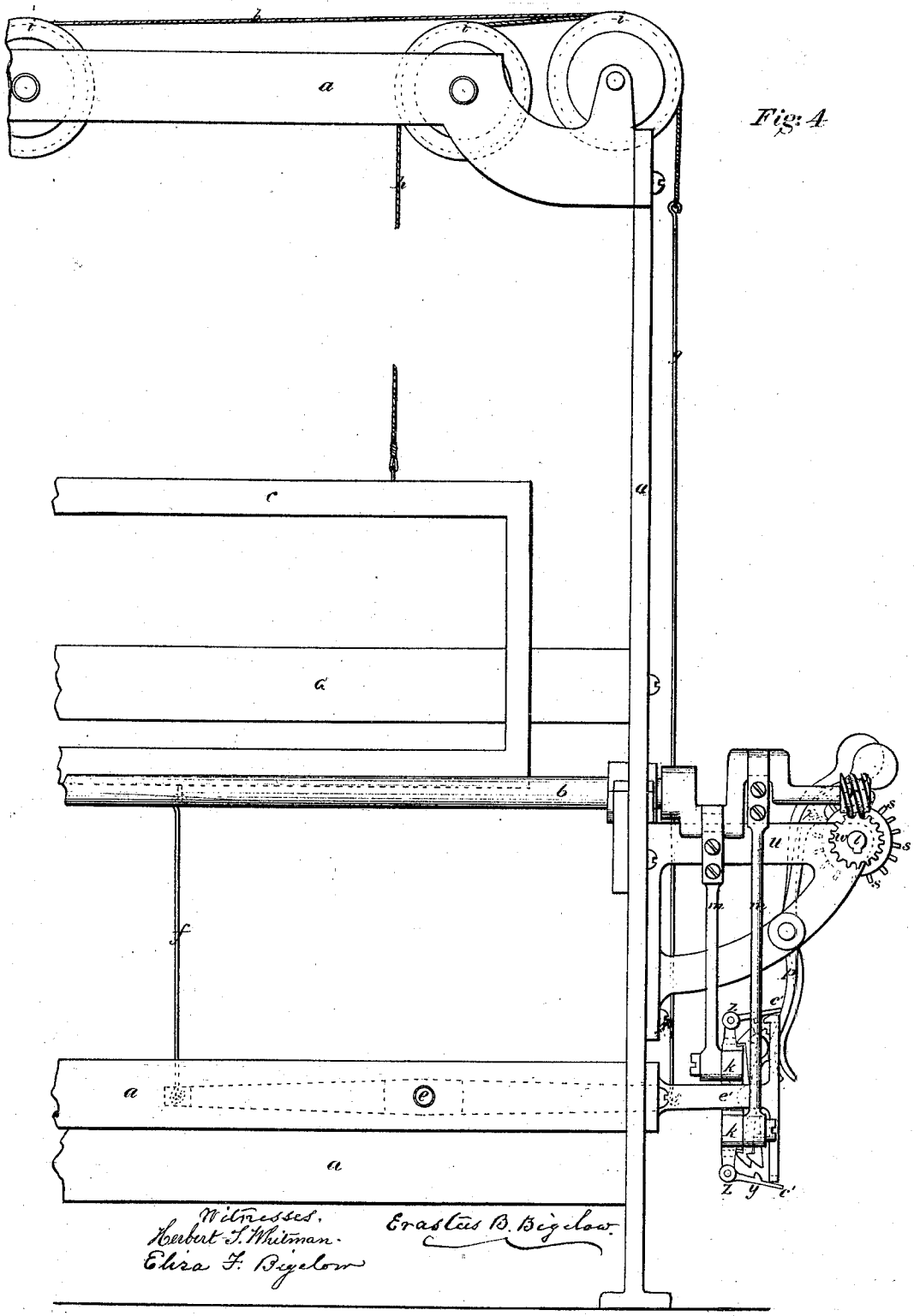

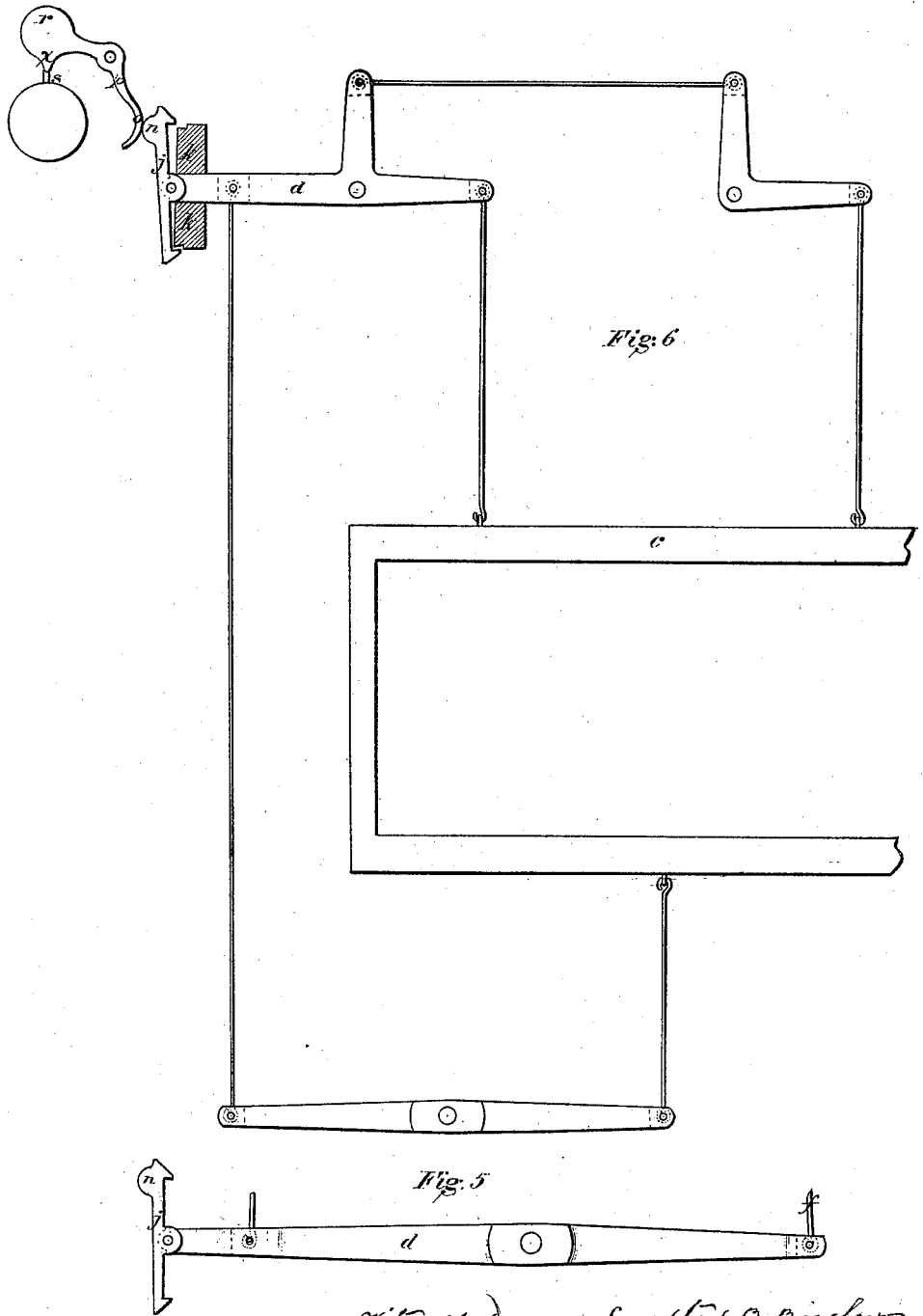

ERASTUS BRIGHAM BIGELOW, OF BOSTON, MASSACHUSETTS.

Letters Patent No. 101,088, dated March 22, 1870.

IMPROVEMENT IN LOOM.

The Schedule referred to in these Letters Patent and making part of the same

I, ERASTUS BRIGHAM BIGELOW, of Boston, in the county of Suffolk and State of Massachusetts, have invented certain Improvements in Harness-Operating Mechanism for Power-Looms, of which the following is a specification.

My invention relates to an arrangement and combination of mechanism, whereby a series of leaves of heddles of a power-loom may be operated in such manner as to produce varied patterns of cloth.

In the accompanying drawings, which embody my invention—

Figure 1 is a front elevation of my improvements, and such other parts of a loom as are necessary to exemplify them.

Figure 2, a left-hand elevation thereof.

Figure 3, a sectional plan, taken on the line A B in fig. 1, with the leaves of heddles removed.

Figure 4, a rear elevation of a part of the loom.

The loom-frame is marked $a$, the lay-shaft $b$, and the leaves of heddles $c$.

A series of heddle-levers, $d$, (corresponding in number with the leaves of the heddles,) are placed in a horizontal position below the leaves of heddles, and oscillate on a central axis, $e$.

Their inner ends are severally connected with the lower edges of the leaves of heddles by rods, $f$, and their outer ends to the upper edges of said leaves of heddles by rods, $g$; and cords, $h$, the cords $h$ passing over grooved guide-pulleys, $i$, as is usual, to change their direction of motion. In lieu of the cords $h$, chains, or bands of steel or other metal, or wires, twisted together or otherwise, may be substituted.

To the outer ends of the horizontal heddle-levers $d$, latch-levers, $j$, are jointed, whereby power may be applied, either to lift or depress the leaves of heddles, in conformity with any desired pattern.

The latch-levers $j$ are formed with hooks, one on each end thereof, (as shown in detail in fig. 5,) which engage interchangably with lifting-bars, $k$.

The lifting-bars $k$ vibrate on studs, $l$, and are actuated by a double-crank on the lay-shaft $b$ and the connecting-rods $m$, as is usual. When they are closed they grasp the heddle-levers, and by bringing them to a central position (as represented in the drawings) close the shed of the warps; and when they are opened they lift or depress the leaves of heddles, according as the latch-levers are tilted, and form the open shed.

The upper arms of the latch-levers are formed with cam-like projections, $n$, which are acted on by similar projections, $o$, on the depending arms of a series of balance-levers, $p$, which oscillate on a stud, $q$, and have weights, $r$, affixed to their upper ends.

The cam-like projections $n$, when unsupported, act as weights to draw the upper hooks of the latch-levers away from the upper lifting-bar, and throw their lower hooks under the lower lifting-bar; and when they are acted on by the projections $o$ of the balance-levers, the weights $r$, when unsupported, (being superior to the weight of the projections $n$,) will push the upper hooks of the latch-levers over the upper lifting-bar, and withdraw their lower hooks from the lower lifting-bar.

Now, suppose all the projections $n$ to be unsupported, the lower hooks of all the latch-levers will engage with the lower lifting-bar, and all the leaves of heddles will be raised; then, on the other hand, suppose the weights $r$ of all the balance-levers to be unsupported, they will cause the upper hooks of all the latch-levers to engage with the upper lifting-bar, and all the leaves of heddles will be depressed.

To govern the action of the balance-levers, and determine which of the leaves of heddles shall be raised and which depressed to form the shed, a pattern-surface, formed on a cylinder, or on a chain or band carried by a cylinder, is employed, which has cam-like projections $s$ arranged upon its surface, in accordance with the figure to be wrought. It is carried by an axis, $t$, which turns in a long bearing projection from a stand, $u$, affixed to the loom-frame, one end of the axis $t$ being free, to facilitate the changing of the pattern-surface. It has a continuous rotary movement imparted to it by the lay-shaft $b$, through the action of the worm $v$ and gear $w$; and to enable the weaver to adjust the position of the pattern-surface relative to the other moving parts of the loom, the worm may be attached to the lay-shaft by a clutch, capable of being disengaged when an adjustment is to be made.

When the pattern-surface revolves, its cam-like projections $s$ act on similar projections $x$ on the weighted ends of the balance levers, and raise them.

From the foregoing description it will be obvious that the latch-levers, acted on by the balance-levers, which are thus raised by the pattern-surface, and supported when the lifting-bars close the shed, will engage with the lower lifting-bars; and those acted on by the balance-levers, which are not so raised and supported, will engage with the upper lifting-bar; and that when the lifting-bars are opened, the leaves of heddles will be raised or depressed accordingly.

By thus shifting the latch-levers by the weights of the balance-levers, instead of the positive action of the pattern-surface, as is usual, the pattern-surface may act on the balance-levers to effect its changes whilst the latch-levers are engaged with the lifting-bars, and its continuous rotary movement thus becomes practicable. The loom is also thus made capable of being turned backward without changing the relation of the pattern-surface to its other moving parts.

To prevent the unsupported weights of the balance-levers from throwing the lower hooks of their latch-levers off of the lower lifting-bar, when the projections $n$ by their closing movement strike against or rest upon the projections o, and also to prevent an untimely escape of the latch-levers from the lifting-bars during their vibration, latch-hooks, y, are employed, which hook on to the ends of the latch-levers and hold them in position whilst they are in action, and are withdrawn when they are to be shifted.

The latch-hooks y are carried by shafts, z, which oscillate in stands, a', affixed to the lifting-bars k, before described.

The latch-hook of the upper lifting-bar tends toward the latch-levers by its own gravity, while that of the lower lifting-bar is drawn toward them by a coiled spring, b', and, when left free to do so, they will respectively hook onto the ends of the latch-levers and hold them in position.

To allow the latch-levers to be shifted, the latch-hooks are released by arms, c', which, when the lifting-bars are about completing their closing movement, strike against stops, d', on a stand, e', projecting from the loom-frame, and turn the shafts z far enough to release the latch-looks. Then, when the lifting-bars begin their opening movement, the arms c' leave the stops d', and allow the latch-hooks to hook onto the ends of the latch-levers and hold them in position until released, as before.

Having described my invention, and pointed out some of the modifications of which it is susceptible without departing from its distinguishing principles,

What I claim as new therein, and desire to secure by Letters Patent, is—

1. The within-described construction and arrangement of a series of leaves of heddles, and a corresponding series of horizontal heddle-levers by which they are actuated, said horizontal heddle-levers being placed below said leaves of heddles, and having centrally-pivoted latch-levers, by which they may be either elevated or depressed, jointed to their outer ends, as herein described.

2. In combination with the above, a continuously-rotating pattern-surface and balance-levers, which transmit the governing action of said pattern-surface to the latch-levers, substantially as described.

ERASTUS B. BIGELOW.

Witnesses:
HERBERT T. WHITMAN,
ELIZA F. BIGELOW.